US012811190B2

(12) United States Patent
Tsuchida et al.

(10) Patent No.: US 12,811,190 B2
(45) Date of Patent: Nov. 24, 2026

(54) ALL-SOLID BATTERY AND PRODUCTION METHOD FOR SAME

(71) Applicant: Panasonic Intellectual Property Management Co., Ltd., Osaka (JP)

(72) Inventors: Shuzo Tsuchida, Nara (JP); Ami Okabe, Osaka (JP); Akihiro Horikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 589 days.

(21) Appl. No.: 18/460,633

(22) Filed: Sep. 4, 2023

(65) Prior Publication Data

US 2023/0411682 A1 Dec. 21, 2023

Related U.S. Application Data

(63) Continuation of application No. PCT/JP2022/008948, filed on Mar. 2, 2022.

(30) Foreign Application Priority Data

Mar. 18, 2021 (JP) ................................ 2021-044254

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0404* (2013.01); *H01M 4/043* (2013.01);
(Continued)

(58) Field of Classification Search
None
See application file for complete search history.

(56) References Cited

U.S. PATENT DOCUMENTS

| | | | |
|---|---|---|---|
| 2020/0212479 | A1 | 7/2020 | Kojima et al. |
| 2020/0212496 | A1 | 7/2020 | Ono et al. |

(Continued)

FOREIGN PATENT DOCUMENTS

| | | |
|---|---|---|
| JP | 2012-038425 | 2/2012 |
| JP | 2012-185974 | 9/2012 |

(Continued)

OTHER PUBLICATIONS

International Search Report of PCT application No. PCT/JP2022/008948 dated Apr. 19, 2022.

*Primary Examiner* — Jonathan Crepeau
(74) *Attorney, Agent, or Firm* — WHDA, LLP

(57) ABSTRACT

An all-solid battery has a structure in which a cathode current collector, a cathode layer that contains cathode active materials constituted by a plurality of particles and solid electrolytes constituted by a plurality of particles, a solid-electrolyte layer that contains solid electrolytes, an anode layer that contains anode active materials and solid electrolytes, and an anode current collector are stacked in this order. The cathode layer includes a region where the plurality of particles constituting the solid electrolytes are filled or continuously densely packed in a sliced surface in a case where an end of the cathode layer is sliced, and a distance between two adjacent particles having a positional relationship across the region among the plurality of particles constituting the cathode active material is 2 times or more than an average particle size of the cathode active materials.

5 Claims, 7 Drawing Sheets

(51) Int. Cl.

| | |
|---|---|
| ***H01M 4/13*** | (2010.01) |
| ***H01M 4/139*** | (2010.01) |
| ***H01M 4/62*** | (2006.01) |
| ***H01M 10/0585*** | (2010.01) |
| *H01M 4/02* | (2006.01) |

(52) U.S. Cl.

CPC ............. *H01M 4/13* (2013.01); *H01M 4/139* (2013.01); *H01M 4/62* (2013.01); *H01M 10/0585* (2013.01); *H01M 2004/028* (2013.01)

(56) References Cited

U.S. PATENT DOCUMENTS

| | | | |
|---|---|---|---|
| 2020/0212497 | A1 | 7/2020 | Kitamura et al. |
| 2020/0212498 | A1 | 7/2020 | Kitamura et al. |

FOREIGN PATENT DOCUMENTS

| | | |
|---|---|---|
| JP | 2015-069775 | 4/2015 |
| JP | 2020-107414 | 7/2020 |
| JP | 2020-107521 | 7/2020 |
| JP | 2020-107525 | 7/2020 |
| JP | 2020-109747 | 7/2020 |

ALL-SOLID BATTERY AND PRODUCTION METHOD FOR SAME

TECHNICAL FIELD

The present disclosure relates to an all-solid battery and a production method for the same, and particularly relates to an all-solid battery using a cathode layer, an anode layer, and a solid-electrolyte layer, and a production method for the same.

BACKGROUND ART

In recent years, there has been a demand for development of a repeatedly usable secondary battery due to weight reduction, cordless achievement, and the like of electronic devices such as personal computers and mobile phones. Examples of the secondary battery include a nickel cadmium battery, a nickel hydrogen battery, a lead storage battery, and a lithium ion battery. Among these secondary batteries, since the lithium ion battery have characteristics such as light weight, high voltage, and high energy density, the lithium ion battery has attracted attention.

In the field of automobiles such as electric vehicles and hybrid vehicles, development of secondary batteries having a high battery capacity is also emphasized, and the demand for lithium ion batteries tends to increase.

The lithium ion battery includes a cathode layer, an anode layer, and an electrolyte disposed therebetween, and for example, an electrolytic solution or a solid electrolyte obtained by dissolving a supporting electrolyte such as lithium hexafluorophosphate in an organic solvent is used as the electrolyte. Currently, since the electrolytic solution containing the organic solvent is used, a widely used lithium ion battery is flammable. Thus, a material, a structure, and a system for securing the safety of the lithium ion battery are required. By contrast, due to the use of a non-flammable solid electrolyte as the electrolyte, it is expected that the above-described material, structure, and system can be simplified, and it is considered that an increase in energy density, a reduction in production cost, and an improvement in productivity can be achieved. Hereinafter, the battery such as the lithium ion battery using the solid electrolyte is referred to as an "all-solid battery".

The solid electrolyte can be roughly divided into an organic solid electrolyte and an inorganic solid electrolyte. The organic solid electrolyte has an ionic conductivity of about $10^{-6}$ S/cm at 25° C., which is extremely lower than an ionic conductivity of the electrolytic solution of about $10^{-3}$ S/cm. Thus, it is difficult to operate the all-solid battery using the organic solid electrolyte in an environment of 25° C. An oxide-based solid electrolyte, a sulfide-based solid electrolyte, and a halide-based solid electrolyte are generally used as the inorganic solid electrolyte. These ionic conductivities are about $10^{-4}$ to $10^{-3}$ S/cm, and the ionic conductivity is relatively high. Thus, in the development of all-solid batteries for increasing a size and a capacity, research on all-solid batteries capable of increasing the size using the sulfide-based solid electrolyte or the like has been actively conducted in recent years.

For example, PTL 1 discloses contents related to an end configuration of an all-solid battery. In PTL 1, the all-solid battery has a stacked structure of a cathode layer, a solid-electrolyte layer, and an anode layer, and the cathode layer and the anode layer are stacked with positions of ends shifted from each other.

CITATION LIST

Patent Literature

PTL 1: Unexamined Japanese Patent Publication No. 2015-69775

SUMMARY OF THE INVENTION

An all-solid battery according to an aspect of the present disclosure includes a cathode current collector, a cathode layer that contains cathode active materials constituted by a plurality of particles and first solid electrolytes constituted by a plurality of particles, a solid-electrolyte layer that contains third solid electrolytes, an anode layer that contains anode active materials and second solid electrolytes, and an anode current collector. The cathode current collector, the cathode layer, the solid-electrolyte layer, the anode layer, and the anode current collector are stacked in this order. The cathode layer includes a region where the plurality of particles constituting the first solid electrolytes are filled or continuously densely packed in a sliced surface of the cathode layer in a case where an end of the cathode layer is sliced, and a distance between two adjacent particles having a positional relationship across the region among the plurality of particles constituting the cathode active material is 2 times or more than an average particle size of the cathode active materials.

DESCRIPTION OF EMBODIMENT

Figure 1:
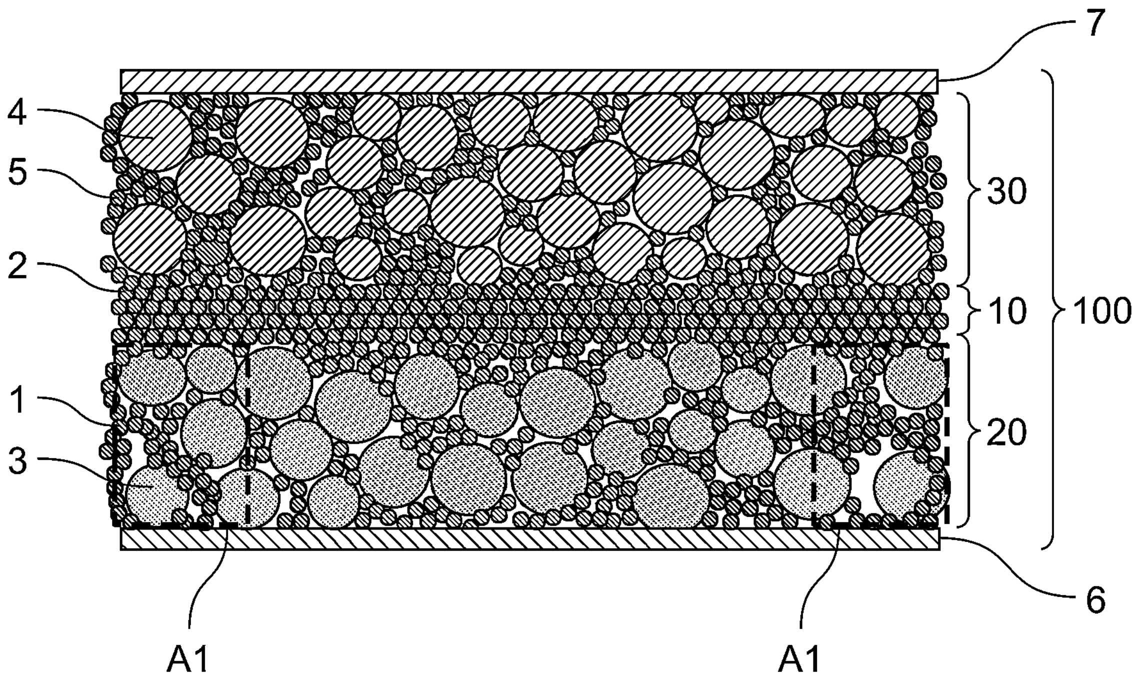
FIG. 1 is a schematic view illustrating a cross section of an all-solid battery according to an exemplary embodiment.

In general, there are the following factors as one of causes of a short circuit at an end of an all-solid battery. For example, since cathode active materials present in a cathode layer expand and contract due to charging and discharging by repeating charging and discharging of the all-solid battery, a crack occurs at an end of the cathode layer. As a result, the cathode active materials fall off, and the fallen cathode active materials come into contact with an anode layer to electrically a short-circuit between the cathode layer and the anode layer.

As a method for preventing the short circuit at the end of the all-solid battery, there is the method disclosed in PTL 1. In PTL 1, the all-solid battery is formed such that the cathode layer and the anode layer are stacked while positions of end faces thereof are shifted from each other and stacked, and an occurrence frequency of the short circuit is reduced by increasing a distance between the ends of the cathode layer and the anode layer. However, a portion corresponding to the shift between the end faces does not contribute to power generation. That is, there are many regions that are not involved in charging and discharging, and thus, deterioration in the energy density is caused.

In addition, in the all-solid battery, it is expected that the energy density indicating a charge and discharge capacity per battery volume is improved. When the amount of shift between the positions of the end faces of the cathode layer and the anode layer is reduced, the ends of the cathode layer and the anode layer are present nearby, and thus, there is a problem that the short circuit easily occurs.

Therefore, the present disclosure provides an all-solid battery or the like that suppresses occurrence of a short circuit.

(Outline of Present Disclosure)

An outline of an aspect of the present disclosure is as follows.

An all-solid battery according to an aspect of the present disclosure includes a cathode current collector, a cathode layer that contains cathode active materials constituted by a plurality of particles and first solid electrolytes constituted by a plurality of particles, a solid-electrolyte layer that contains third solid electrolytes, an anode layer that contains anode active materials and second solid electrolytes, and an anode current collector. The cathode current collector, the cathode layer, the solid-electrolyte layer, the anode layer, and the anode current collector are stacked in this order. The cathode layer includes a region where the plurality of particles constituting the first solid electrolytes are filled or continuously densely packed in a sliced surface of the cathode layer in a case where an end of the cathode layer is sliced, and a distance between two adjacent particles having a positional relationship across the region among the plurality of particles constituting the cathode active materials is 2 times or more than an average particle size of the cathode active materials.

Accordingly, the distance between the adjacent particles of the cathode active materials is increased at the end of the cathode layer. Thus, contact points between the particles of the cathode active materials are hardly formed, and the cathode active materials are hardly effectively used at the end of the cathode layer. That is, the cathode active materials at the end of the cathode layer are hardly distorted due to expansion and contraction due to charging and discharging. Thus, the all-solid battery can suppress falling of the cathode active materials from the end due to chipping and cracking of the cathode layer, and occurrence of a short circuit due to the falling of the cathode active materials.

In addition, for example, in a case where the cathode layer is sliced, the cathode layer includes a first surface that is a sliced surface obtained by slicing the end of the cathode layer and a second surface that is a sliced surface obtained by slicing a central portion of the cathode layer, the first surface has a first proportion A that is a proportion occupied by the cathode active materials per unit area of the first surface, the second surface has a second proportion B that is a proportion occupied by the cathode active materials per unit area of the second surface, and a relationship of $A/B \leq 0.9$ is satisfied.

Accordingly, there is a portion where the cathode active materials are in a sparse state at the end of the cathode layer, and the contact points between the particles of the cathode active materials are hardly formed, and the cathode active materials are hardly effectively used at the end of the cathode layer. Thus, the all-solid battery can suppress the occurrence of the short circuit.

In addition, for example, in a case where the cathode layer is sliced, the cathode layer includes a third surface that is a sliced surface obtained by slicing the end of the cathode layer and a fourth surface that is a sliced surface obtained by slicing the central portion of the cathode layer, the third surface has a third proportion C that is a proportion occupied by the cathode active materials per unit area of the third surface, the fourth surface has a fourth proportion D that is a proportion occupied by the cathode active materials per unit area of the fourth surface, and a relationship of $C/D \geq 1.1$ is satisfied.

Accordingly, at the end of the cathode layer, there is also a portion where the cathode active materials are densely packed. Thus, an excessive increase in an electric resistance value at the end of the cathode layer is suppressed, and deterioration in an energy density of the all-solid battery can be suppressed.

In addition, a method for producing an all-solid battery according to an aspect of the present disclosure is the production method of the all-solid battery including (i) a cathode layer forming step of dry-coating a cathode mixture on a cathode current collector to form a coating film on the cathode current collector, the coating film including the cathode mixture containing a plurality of particles constituting cathode active materials and a plurality of particles constituting first solid electrolytes on a cathode current collector, (ii) a cathode layer preliminary pressurizing step of pressurizing the coating film to form a cathode layer, (iii) a stacking step of stacking the cathode layer, a solid-electrolyte layer, and an anode layer in this order to form a stacked body, and (iv) a pressing step of pressurizing the stacked body. In the cathode layer preliminary pressurizing step, the coating film is pressurized one or more times, and a first portion in the coating film in a first pressurization is pressurized with a strong pressure than in a second portion different from the first portion.

Accordingly, since the first portion in the coating film to become the cathode layer is pressurized with the stronger pressure than in the second portion, the coating film is compressed while the movement of the particles between the cathode active materials and the first solid electrolytes is suppressed. As a result, in the first portion, dispersibility between the cathode active materials and the first solid electrolytes can be worse than in the second portion, and a region where the distance between adjacent particles of the cathode active materials in the cathode layer becomes long can be formed. The above-described all-solid battery can be produced by producing the portion formed in this manner to be the end of the cathode layer. Thus, it is not necessary to produce the above-described all-solid battery by changing only the material of the end of the cathode layer in order to produce the all-solid battery, and the all-solid battery can be continuously produced by using the identical material.

In addition, for example, in the cathode layer preliminary pressurizing step, the coating film may be pressurized two or more times.

Accordingly, as compared with a case where the coating film is pressurized only one time, in a case where the coating film is pressurized two or more times, since the coating film is gradually compressed, air between the particles contained in a cathode mixture layer is easily released, and a portion where the solid electrolytes and the cathode active materials are uniformly dispersed is easily formed. For example, the solid electrolytes and the cathode active materials are easily uniformly dispersed in other portions that are not pressurized more strongly than in some portions in the first pressurization. Thus, since the cathode active materials of the cathode layer formed by using the coating film is easily used effectively, the all-solid battery with improved energy density can be produced.

In addition, for example, the production method may further include a cutting step of cutting the first portion along a thickness direction of the cathode layer.

Accordingly, a portion cut in the cutting step becomes the end of the cathode layer. Thus, it is possible to easily produce the all-solid battery including the cathode layer having the region where the distance between the cathode active materials becomes long at the end.

In addition, for example, in the cathode layer preliminary pressurizing step, the first portion may be pressurized to be the end of the all-solid battery after cutting in the cutting step.

Accordingly, the first portion to be strongly pressurized is disposed in accordance with a size of the all-solid battery, and thus, cutting can be performed in accordance with the first portion. Accordingly, a plurality of all-solid batteries can be efficiently produced.

Hereinafter, an all-solid battery according to an exemplary embodiment will be described in detail. Note that, the exemplary embodiment to be described below provides a comprehensive or specific example. Numerical values, shapes, materials, components, arrangement positions and connection modes of the components, steps, and the like illustrated in the following exemplary embodiments are merely examples, and are not intended to limit the present disclosure.

In addition, in the present specification, a term indicating a relationship between elements such as parallel, a term indicating a shape of an element such as a rectangle, and a numerical range are not expressions representing only a strict meaning, but are expressions meaning to include a substantially equivalent range, for example, a difference of about several %.

In addition, the drawings are schematic views in which emphasis, omission, and proportion adjustment are performed as required for illustration of the present disclosure, and these drawings may have shapes, positional relationships, and proportions that differ from actual shapes, actual positional relationships, and actual proportions. In the drawings, substantially identical configurations are designated by the same reference marks, and duplicate description may be omitted or simplified.

In addition, in the present description, the terms “upper” and “lower” in a configuration of the all-solid battery do not refer to an upper direction (vertically upward) and a lower direction (vertically downward) in absolute space recognition, but are used as terms defined by a relative positional relationship based on a stacking order in a stacking configuration. In addition, the terms “upper” and “lower” are not only applied to a case where two components are disposed in close contact with each other and two components are in contact with each other, but are also applied to a case where two components are disposed spaced apart from each other and another component is present between two components.

In addition, in the present specification, a cross-sectional view is a diagram illustrating a cross section in a case where a central portion of the all-solid battery is cut in a stacking direction, that is, a thickness direction of each layer.

Exemplary Embodiment

<Configuration>

[A. All-Solid Battery]

An outline of the all-solid battery according to the present exemplary embodiment will be described with reference to FIG. 1. FIG. 1 is a schematic view illustrating a cross section of all-solid battery 100 according to the present exemplary embodiment. All-solid battery 100 according to the present exemplary embodiment includes cathode current collector 6, anode current collector 7, cathode layer 20 formed on a surface of cathode current collector 6 close to anode current collector 7 and containing cathode active materials 3 and solid electrolytes 1, anode layer 30 formed on a surface of anode current collector 7 close to cathode current collector 6 and containing anode active materials 4 and solid electrolytes 5, and solid-electrolyte layer 10 disposed between cathode layer 20 and anode layer 30 and containing solid electrolytes 2 having at least ion conductivity. In other words, all-solid battery 100 has a structure in which cathode current collector 6, cathode layer 20, solid-electrolyte layer 10, anode layer 30, and anode current collector 7 are stacked in this order. In addition, a region corresponding to end A1 of cathode layer 20 has a structure in which dispersibility of cathode active materials 3 and solid electrolytes 1 is worse than in the other region of cathode layer 20 (for example, a central portion of cathode layer 20).

Note that, in the present exemplary embodiment, solid electrolyte 1 is an example of a first solid electrolyte, solid electrolyte 5 is an example of a second solid electrolyte, and solid electrolyte 2 is an example of a third solid electrolyte.

All-solid battery 100 is formed, for example, by the following method. First, cathode layer 20 containing cathode active materials 3 formed on cathode current collector 6 made of a metal foil, anode layer 30 containing anode active materials 4 formed on anode current collector 7 made of a metal foil, and solid-electrolyte layer 10 containing solid electrolytes 2 having ion conductivity disposed between cathode layer 20 and anode layer 30 are formed. All-solid battery 100 is obtained by performing pressing at a pressure, for example, from 100 MPa to 1000 MPa inclusive from an outside of cathode current collector 6 and anode current collector 7 and setting a filling rate of at least one layer of each layer is set from 60% to 100% inclusive. The filling rate is set to be 60% or more, and thus, the number of voids decreases in solid-electrolyte layer 10, cathode layer 20, or anode layer 30. Accordingly, lithium (Li) ion conduction and electron conduction are frequently performed, and good charge and discharge characteristics are obtained. Note that, the filling rate is a proportion of a volume occupied by materials excluding voids between materials to a total volume in each layer. Note that, a detailed method for producing all-solid battery 100 will be described later.

For example, a terminal is attached to pressed all-solid battery 100, and the all-solid battery 100 is housed in a case. For example, an aluminum stacked bag, a case made of metal such as stainless steel (SUS), iron, or aluminum, a case made of resin, or the like is used as the case of all-solid battery 100.

Hereinafter, solid-electrolyte layer 10, cathode layer 20, and anode layer 30 of all-solid battery 100 according to the present exemplary embodiment will be described in detail.

[B. Solid-Electrolyte Layer]

First, solid-electrolyte layer 10 will be described. Solid-electrolyte layer 10 according to the present exemplary embodiment contains solid electrolytes 2, and may further contain a binder.

[B-1. Solid Electrolyte]

Solid electrolytes 2 according to the present exemplary embodiment will be described. Examples of the solid electrolyte material used for solid electrolyte 2 include a sulfide-based solid electrolyte, a halide-based solid electrolyte, and an oxide-based solid electrolyte, which are generally known materials. Any of the sulfide-based solid electrolyte, the halide-based solid electrolyte, and the oxide-based solid electrolyte may be used as the solid electrolyte material. A type of the sulfide-based solid electrolyte according to the present exemplary embodiment is not particularly limited. Examples of the sulfide-based solid electrolyte include $Li_2S—SiS_2$, $LiI—Li_2S—SiS_2$, $LiI—Li_2S—P_2S_5$, $LiI—Li_2S—P_2O_5$, $LiI—Li_3PO_4—P_2S_5$, and $Li_2S—P_2S_5$. In particular, the sulfide-based solid electrolyte may contain Li, P, and S from the viewpoint of excellent ion conductivity of lithium. In addition, since the sulfide-based solid electrolyte has high reactivity with a binder and high bondability with a binder, the sulfide-based solid electrolyte may contain $P_2S_5$. Note that, the above description of "$Li_2S—P_2S_5$" means a sulfide-based solid electrolyte obtained by using a raw material composition containing $Li_2S$ and $P_2S_5$, and the same applies to other descriptions.

In the present exemplary embodiment, the sulfide-based solid electrolyte is, for example, a sulfide-based glass ceramic containing $Li_2S$ and $P_2S_5$, and a ratio between $Li_2S$ and $P_2S_5$ may be in a range from 70:30 to 80:20 or in a range from 75:25 to 80:20 for $Li_2S$:$P_2S_5$ in terms of mol. The ratio between $Li_2S$ and $P_2S_5$ is set within this range, and thus, a crystal structure having high ion conductivity can be obtained while an Li concentration that influences battery characteristics is maintained. In addition, the ratio between $Li_2S$ and $P_2S_5$ is set within the range, and thus, the amount of $P_2S_5$ for reacting with and binding to the binder is easily secured.

In addition, solid electrolytes 2 are constituted by, for example, a plurality of particles.

[B-2. Binder]

The binder according to the present exemplary embodiment will be described. The binder is an adhesive that does not have ion conductivity and electron conductivity and plays a role of bonding materials in solid-electrolyte layer 10 to each other and solid-electrolyte layer 10 to another layer. A known battery binder is used as the binder. In addition, the binder according to the present exemplary embodiment may contain a thermoplastic elastomer into which a functional group for improving adhesion strength is introduced. In addition, the functional group may be a carbonyl group. In addition, from the viewpoint of improving the adhesion strength, the carbonyl group may be maleic anhydride. An oxygen atom of the maleic anhydride of the binder reacts with solid electrolytes 2, bonds solid electrolytes 2 to each other via the binder, and forms a structure in which the binder is disposed between solid electrolytes 2. As a result, the adhesion strength is improved.

For example, styrene-butadiene-styrene (SBS), styrene-ethylene-butadiene-styrene (SEBS), or the like is used as the thermoplastic elastomer. This is because these materials have high adhesion strength and high durability even in cycle characteristics of the battery. A hydrogenated (hereinafter, hydrogenation) thermoplastic elastomer may be used as the thermoplastic elastomer. Due to the use of the hydrogenated thermoplastic elastomer, reactivity and bonding property are improved, and solubility in a solvent used for forming solid-electrolyte layer 10 is improved.

An addition amount of the binder is, for example, from 0.01 mass % to 5 mass % inclusive, may be from 0.1 mass % to 3 mass % inclusive, or may be from 0.1 mass % to 1 mass % inclusive. The addition amount of the binder is set to 0.01 mass % or more, and thus, the bonding via the binder easily occurs. Accordingly, sufficient adhesion strength is easily obtained. In addition, the addition amount of the binder is set to 5 mass % or less, and thus, deterioration in battery characteristics such as charge and discharge characteristics hardly occurs. For example, even though physical property values such as hardness, tensile strength, and tensile elongation of the binder change in a low temperature region, charge and discharge characteristics further hardly deteriorate.

[C. Cathode Layer]

Next, cathode layer 20 according to the present exemplary embodiment will be described. Cathode layer 20 according to the present exemplary embodiment contains solid electrolytes 1 and cathode active materials 3. A conductive auxiliary agent such as acetylene black and KETJENBLACK (registered trademark) and a binder may be further added to cathode layer 20 as necessary in order to secure electron conductivity, but in a case where the addition amount is large, since battery performance is influenced, the amount is desirably small to such an extent that the battery performance is not influenced. A weight ratio between solid electrolytes 1 and cathode active materials 3 may be, for example, in a range from 50:50 to 5:95, or in a range from 30:70 to 10:90 for solid electrolytes 1:cathode active materials 3. In addition, a volume ratio of cathode active materials 3 to a total volume of cathode active materials 3 and solid electrolytes 1 is, for example, from 60% to 80% inclusive. With this volume ratio, both a lithium ion conduction path and an electron conduction path in cathode layer 20 are easily secured.

Cathode current collector 6 is made of, for example, a metal foil. For example, a metal foil of stainless steel (SUS), aluminum, nickel, titanium, copper, or the like is used as the metal foil.

[C-1. Solid Electrolyte]

Solid electrolyte 1 is at least one or more voluntarily selected from the solid electrolyte materials listed in [B-1 Solid electrolyte], and the other materials are not particularly limited. For example, the same solid electrolyte material as solid electrolyte 2 is used for solid electrolyte 1. Different solid electrolyte materials may be used for solid electrolytes 1 and solid electrolytes 2. In addition, solid electrolytes 1 are constituted by a plurality of particles.

[C-2. Binder]

Since the binder is the same as the binder, the description thereof will be omitted.

[C-3. Cathode Active Material]

Cathode active materials 3 according to the present exemplary embodiment will be described. For example, a lithium-containing transition metal oxide is used as a material of cathode active material 3 according to the present exemplary embodiment. Examples of the lithium-containing transition metal oxide include $LiCoO_2$, $LiNiO_2$, $LiMn_2O_4$, $LiCoPO_4$, $LiNiPO_4$, $LiFePO_4$, $LiMnPO_4$, compounds obtained by substituting transition metal of these compounds with one or two different elements, and the like. Known materials such as $LiNi_{1/3}Co_{1/3}Mn_{1/3}O_2$, $LiNi_{0.8}Co_{0.15}Al_{0.05}O_2$, and $LiNi_{0.5}Mn_{1.5}O_2$ are used as the compounds obtained by substituting the transition metal of the compounds with one or two different elements. One type or a combination of two or more types may be used as the material of cathode active material 3.

In addition, cathode active materials 3 are constituted by a plurality of particles. An average particle size of cathode active materials 3 is not particularly limited, but is, for example, from 1 μm to 10 μm inclusive. In addition, the average particle size of cathode active materials 3 is larger than an average particle size of solid electrolytes 1, for example.

[D. Anode Layer]

Next, anode layer 30 according to the present exemplary embodiment will be described. Anode layer 30 of the present exemplary embodiment contains solid electrolytes 5 and anode active materials 4. A conductive auxiliary agent such as acetylene black or KETJENBLACK and a binder may be further added to anode layer 30 as necessary in order to secure electron conductivity, but in a case where the addition amount is large, since battery performance is influenced, the amount is desirably small to such an extent that the battery performance is not influenced. A ratio between solid electrolytes 5 and anode active materials 4 may be, for example, within a range from 5:95 to 60:40, or within a range from 30:70 to 50:50 for solid electrolytes 5:anode active materials 4 in terms of weight. In addition, a volume ratio of anode active materials 4 to a total volume of anode active materials 4 and solid electrolytes 1 is, for example, from 60% to 80% inclusive. With this volume ratio, both the lithium ion conduction path and the electron conduction path in anode layer 30 are easily secured.

Anode current collector 7 is made of, for example, a metal foil. For example, a metal foil such as SUS, copper, or nickel is used as the metal foil.

[D-1. Solid Electrolyte]

Solid electrolyte 5 is at least one or more voluntarily selected from the solid electrolyte materials listed in [B-1 Solid electrolyte], and the other materials are not particularly limited. For example, the same solid electrolyte material as solid electrolyte 1 and solid electrolyte 2 is used for solid electrolyte 5. Different solid electrolyte materials may be used for solid electrolyte 5, solid electrolyte 1, and solid electrolyte 2. In addition, solid electrolytes 5 are constituted by, for example, a plurality of particles. [D-2. Binder]

Since the binder is the same as the binder, the description thereof will be omitted.

[D-3. Anode Active Material]

Anode active materials 4 according to the present exemplary embodiment will be described. For example, metal easily alloyed with lithium such as indium, tin, or silicon, a carbon material such as hard carbon or graphite, lithium, or a known material such as $Li_4Ti_5O_{12}$ or $SiO_x$ is used as a material of anode active material 4 according to the present exemplary embodiment.

In addition, anode active materials 4 are constituted by, for example, a plurality of particles. An average particle size of anode active materials 4 is not particularly limited, but is, for example, from 1 μm to 15 μm inclusive.

(Production Method)

Figure 2A:
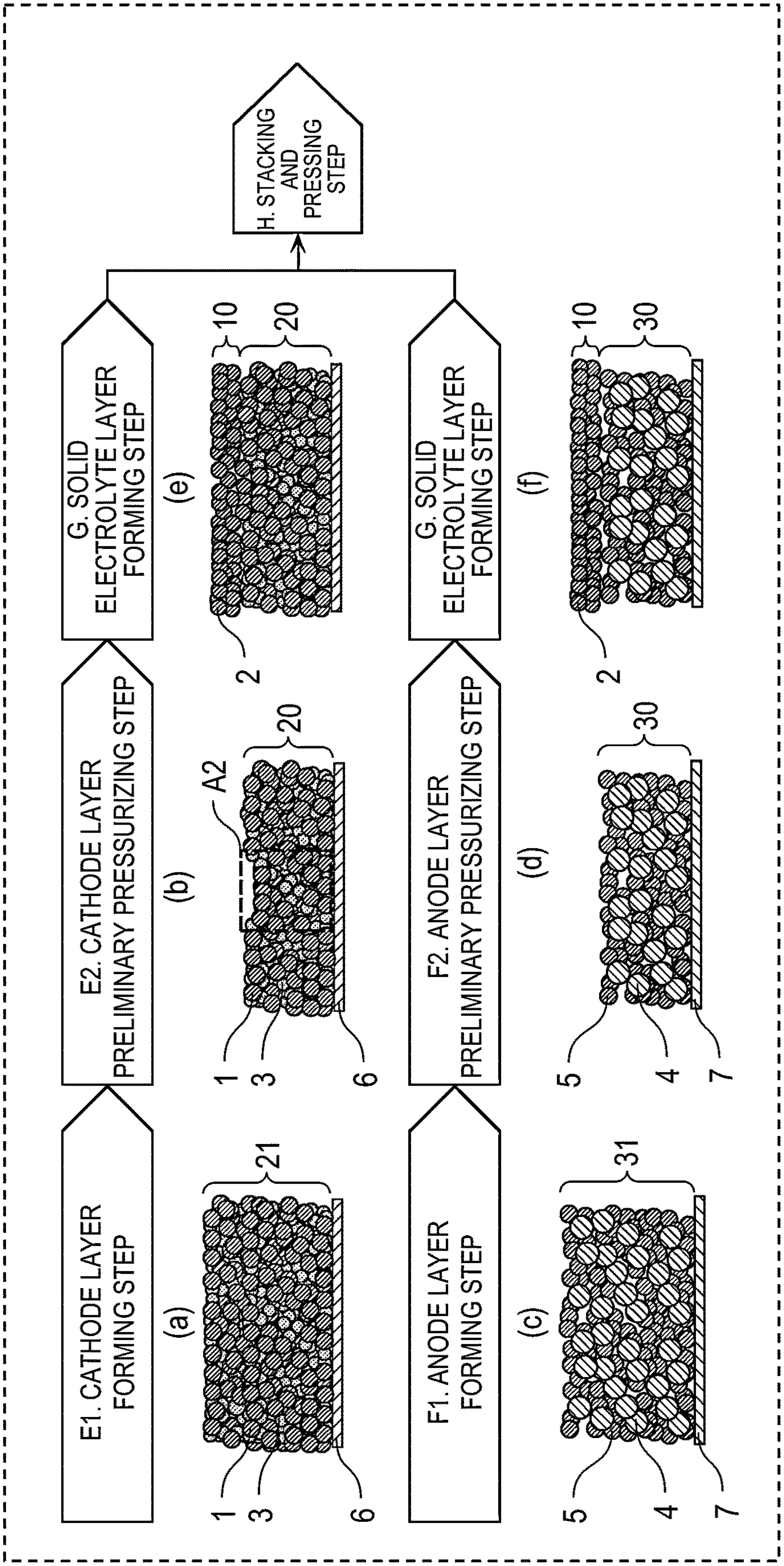
FIG. 2A is a schematic cross-sectional view for describing a method for producing the all-solid battery according to the exemplary embodiment.
Figure 2B:
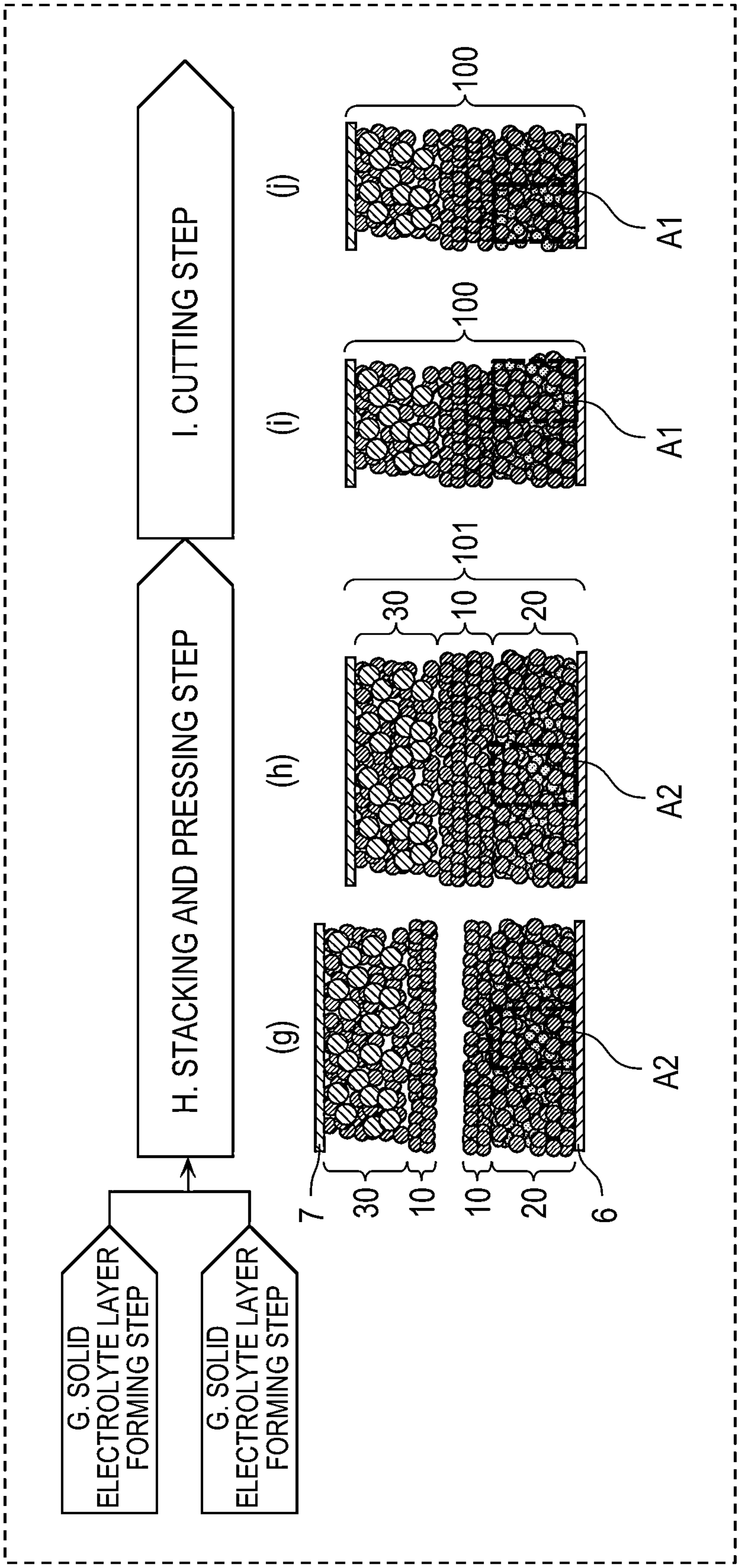
FIG. 2B is a schematic cross-sectional view for describing a step subsequent to FIG. 2A of the method for producing the all-solid battery according to the exemplary embodiment.

Next, a method for producing all-solid battery 100 according to the present exemplary embodiment will be described with reference to FIGS. 2A and 2B. Specifically, the method is a method for producing all-solid battery 100 including solid-electrolyte layer 10, cathode layer 20, and anode layer 30. FIG. 2A is a schematic cross-sectional view for describing the method for producing all-solid battery 100. FIG. 2B is a schematic cross-sectional view for describing steps subsequent to FIG. 2A in the method for producing all-solid battery 100.

The method for producing all-solid battery 100 includes, for example, a cathode layer forming step, a cathode layer preliminary pressurizing step, an anode layer forming step, an anode layer preliminary pressurizing step, a solid-electrolyte layer forming step, a stacking step, a pressing step, and a cutting step. In the cathode layer forming step ((a) of FIG. 2A), coating film 21 to be cathode layer 20 is formed on cathode current collector 6. In the cathode layer preliminary pressurizing step ((b) of FIG. 2A), coating film 21 is pressurized and compressed within a handleable range in a subsequent step to form cathode layer 20. In addition, in the anode layer forming step ((c) of FIG. 2A), coating film 31 to be anode layer 30 is formed on anode current collector 7. In the anode layer preliminary pressurizing step ((d) of FIG. 2A), coating film 31 is pressurized and compressed within a handleable range in a subsequent step to form anode layer 30. Further, in the solid-electrolyte layer forming step ((e) and (f) of FIG. 2A), solid-electrolyte layer 10 is formed. In the stacking step and the pressing step ((g) and (h) of FIG. 2B), cathode layer 20 formed on cathode current collector 6, anode layer 30 formed on anode current collector 7, and formed solid-electrolyte layer 10 are stacked such that solid-electrolyte layer 10 is disposed between cathode layer 20 and anode layer 30, and are pressed from the outside of cathode current collector 6 and anode current collector 7. Next, in the cutting step ((i) and (j) of FIG. 2B), cathode layer 20, anode layer 30, and solid-electrolyte layer 10 which are stacked are cut to produce all-solid battery 100.

Here, although the contents that cathode layer 20, anode layer 30, and solid-electrolyte layer 10 are cut in a stacked state have been described above, it is also possible to produce all-solid battery 100 by cutting cathode layer 20 after the cathode layer preliminary pressurizing step, stacking anode layer 30 and solid-electrolyte layer 10 on cut cathode layer 20, and pressing the stacked body. What is important is that the dispersibility of cathode active materials 3 and solid electrolytes 1 constituting cathode layer 20 is worse at the end of all-solid battery 100 to be produced than in other portions. A concept of producing such a state will be described later.

Hereinafter, steps will be described in detail.

[E1. Cathode Layer Forming Step]

First, the cathode layer forming step is performed as illustrated in (a) of FIG. 2A. Examples of the forming step of cathode layer 20 (cathode layer forming step) according to the present exemplary embodiment include the following methods.

In the cathode layer forming step, a cathode mixture containing a plurality of particles constituting cathode active materials 3 and a plurality of particles constituting solid electrolytes 1 is dry-coated on cathode current collector 6. The cathode layer forming step includes, for example, a mixture adjusting step and a powder stacking step. In the mixture adjusting step, solid electrolytes 1 and cathode active materials 3 in a powder state, which are not slurried, are prepared, a binder and a conductive auxiliary agent (not illustrated) are further prepared as necessary, the prepared materials are mixed while appropriate shear and pressure are applied, and a cathode mixture in which cathode active materials 3 and solid electrolytes 1 are uniformly dispersed is prepared. In the powder stacking step, the prepared cathode mixture is uniformly dry-coated on cathode current collector 6 to form coating film 21. The production of the cathode mixture in the powder state by stacking the cathode mixture in a film form has an advantage that a drying step is unnecessary and the production cost is reduced as compared with a wet coating method for applying a slurry dispersed in a solvent and has an effect that a solvent contributing to the deterioration in the battery performance of all-solid battery 100 does not remain in formed cathode layer 20.

[E2. Cathode Layer Preliminary Pressurizing Step]

Next, the cathode layer preliminary pressurizing step is performed as illustrated in (b) of FIG. 2A. Cathode layer 20 is formed by pressurizing coating film 21 made of the cathode mixture coated in the cathode layer forming step. Specifically, the cathode mixture powder is densified to a level at which the cathode mixture powder is easily handled in a subsequent step by pressurizing the stacked body including cathode current collector 6, solid electrolytes 1, and cathode active materials 3 obtained in the cathode layer forming step is pressurized and cathode layer 20 is formed as a powder compressed film.

Here, in the cathode layer preliminary pressurizing step, it is important to pressurize partial portion A2 (first portion) in coating film 21 (cathode layer 20 formed by pressurizing coating film 21 in FIG. 2A) with a stronger pressure than in the other portion (second portion). Specifically, portion A2 corresponding to the end of cathode layer 20 in all-solid battery 100 formed in the cutting step to be described later is pressurized with a stronger pressure than in the other portion. That is, portion A2 cut in a subsequent cutting step is pressurized with a stronger pressure than in the other portion to be the end of all-solid battery 100 after cutting in the cutting step. The purpose of such pressurization is to make a portion corresponding to the end of all-solid battery 100 in cathode layer 20 to be formed have a configuration in which solid electrolytes 1 and cathode active materials 3 are dispersed in different states (specifically, a configuration in which a dispersion state is bad) as compared with the other portion. Thus, the pressure to be pressurized is adjusted in accordance with the material to be used within a range to realize the purpose. Note that, partial portion A2 may not be a position to be the end of all-solid battery 100 after cutting in the cutting step. For example, in the cutting step, cutting may be performed such that partial portion A2 is included in all-solid battery 100 after cutting, and a position of the end of all-solid battery 100 may be adjusted by cutting the end of all-solid battery 100 or the like such that partial portion A2 becomes the end of all-solid battery 100.

In addition, in the cathode layer preliminary pressurizing step, for example, pressurization is performed two or more times. At this time, in at least the first pressurization, as described above, partial portion A2 of coating film 21 is pressurized with a stronger pressure than in the other portion. In second and subsequent pressurization, entire coating film 21 is uniformly pressurized. Even in the second and subsequent pressurization, partial portion A2 of coating film 21 may be pressurized with a stronger pressure than in the other portion. In addition, at least a pressurizing pressure of the other portion in the second and subsequent pressurization is higher than a pressurizing pressure of the other portion in the first pressurization. Accordingly, although details will be described later, a portion other than partial portion A2 is gradually compressed by gradually pressurizing coating film 21 two or more times, and air in the cathode mixture is easily released. Accordingly, solid electrolytes 1 and cathode active materials 3 are uniformly dispersed. As a result, cathode active materials 3 at a portion other than partial portion A2 in cathode layer 20 formed through this step is effectively utilized, and the energy density of all-solid battery 100 is improved.

Note that, in the cathode layer preliminary pressurizing step, pressurization may not be performed two or more times. For example, cathode layer 20 having a portion where solid electrolytes 1 and cathode active materials 3 are uniformly dispersed may be formed by performing only the first pressurization in the cathode layer preliminary pressurizing step and performing pressurization corresponding to the second and subsequent pressurization in the pressing step on the stacked body of cathode layer 20, solid-electrolyte layer 10, and anode layer 30 in the pressing step.

[F1. Anode Layer Forming Step]

As illustrated in (c) of FIG. 2A, the anode layer forming step is performed in parallel with the cathode layer forming step and the cathode layer preliminary pressurizing step. In the forming step of anode layer 30 (anode layer forming step) according to the present exemplary embodiment, a basic forming method is similar to the above [E1. Cathode layer forming step] except that the material to be used is changed to a material for anode layer 30. That is, in the anode layer forming step, an anode mixture containing a plurality of particles constituting anode active materials 4 and a plurality of particles constituting solid electrolytes 5 is dry-coated on anode current collector 7. The anode layer forming step includes, for example, a mixture adjusting step and a powder stacking step. In the mixture adjusting step, solid electrolytes 5 and anode active materials 4 in a powder state, which are not slurried, are prepared, and a binder and a conductive auxiliary agent (not illustrated) are further prepared as necessary, and an anode mixture containing these materials is prepared. In the powder stacking step, the prepared anode mixture is uniformly dry-coated on anode current collector 7 to form coating film 31.

[F2. Anode Layer Preliminary Pressurizing Step]

Next, the anode layer preliminary pressurizing step is performed as illustrated in (d) of FIG. 2A. In the anode layer preliminary pressurizing step, coating film 31 made of the anode mixture coated in the anode layer forming step is pressurized to form anode layer 30. For example, there may be employed a method for densifying the anode mixture powder to a level at which the anode mixture powder is easily handled in a subsequent step by pressurizing the stacked body including anode current collector 7, solid electrolytes 5, and anode active materials 4 obtained in the anode layer forming step and forming anode layer 30 as a powder compressed film (that is, similarly to the method in [E2. Cathode layer preliminary pressurizing step]). Note that, in the anode layer preliminary pressurizing step, entire coating film 31 may be uniformly pressurized from the first pressurization.

Note that, the method for forming anode layer 30 is not limited to the above-described method, and may be, for example, a method using a slurried anode mixture.

[G. Solid-Electrolyte Layer Forming Step]

Next, a solid-electrolyte layer forming step is performed as illustrated in (e) and (f) of FIG. 2A. A basic forming method in the forming step of solid-electrolyte layer 10 (solid-electrolyte layer forming step) according to the present exemplary embodiment is similar to the above [E1. Cathode layer forming step] except that the material to be used is changed to a material for solid-electrolyte layer 10. Solid-electrolyte layer 10 according to the present exemplary embodiment is formed by, for example, stacking solid electrolytes 2 in a film form.

In the forming step of solid-electrolyte layer 10, solid electrolytes 2 selected from the materials listed in [B-1. Solid electrolyte] are used. Solid-electrolyte layer 10 is formed by mixing solid electrolytes 2 in the powder state and the binder to prepare the solid electrolyte mixture as necessary and stacking the solid electrolyte mixture in a film form on at least one of the cathode layer and the anode layer obtained in [E2. Cathode layer preliminary pressurizing step] and [F2. Anode layer preliminary pressurizing step].

In the example illustrated in (e) and (f) of FIG. 2A, solid-electrolyte layer 10 containing solid electrolytes 2 is directly stacked in a film form on cathode layer 20 and anode layer 30. However, the present disclosure is not limited thereto, and solid-electrolyte layer 10 containing solid electrolytes 2 may be directly formed in a film form on any one of cathode layer 20 and anode layer 30. In addition, solid-electrolyte layer 10 may be prepared on a base material such as a polyethylene terephthalate (PET) film by forming a slurry, applying the slurry, and drying by using the above-mentioned method or solvent, and prepared solid-electrolyte layer 10 may be indirectly stacked on cathode layer 20 and/or anode layer 30.

[H. Stacking Step and Pressing Step]

Next, the stacking step and the pressing step are performed as illustrated in (g) and (h) of FIG. 2B. In the stacking step, cathode layer 20, solid-electrolyte layer 10, and anode layer 30 are stacked in this order. In the pressing step, the stacked body stacked in the stacking step is pressurized. Specifically, in the stacking step and the pressing step, cathode layer 20 formed on cathode current collector 6, anode layer 30 formed on anode current collector 7, and solid-electrolyte layer 10 obtained in each forming step and each preliminary pressurizing step are stacked such that solid-electrolyte layer 10 is disposed between cathode layer 20 and anode layer 30 (stacking step), and then pressing is performed from the outside of cathode current collector 6 and anode current collector 7 (pressing step). As a result, all-solid battery 101 before cutting is obtained.

The purpose of pressing is to increase densities of cathode layer 20, anode layer 30, and solid-electrolyte layer 10. Lithium ion conductivity and electron conductivity can be improved in cathode layer 20, anode layer 30, and solid-electrolyte layer 10 by increasing the densities, and all-solid battery 100 having good battery characteristics is obtained.

[I. Cutting Step]

Next, the cutting step is performed as illustrated in (i) and (j) of FIG. 2B. In the cutting step, partial portion A2 in cathode layer 20 is cut along a thickness direction of cathode layer 20. In addition, in the cutting step, all-solid battery 101 before cutting is cut into a schematic shape of all-solid battery 100. It is an object to divide all-solid battery 101 before cutting formed in the stacking step and the pressing step in accordance with a final product size of all-solid battery 100, and to cut partial portion A2 in cathode layer 20, and a cutting method in the cutting step is not particularly limited. For example, a mechanical cutting method or a cutting method by irradiation with laser or the like is used as the cutting method. In addition, in the cutting step, the adjustment is performed to cut portion A2 corresponding to the end of cathode layer 20 in all-solid battery 100 described in [E2. Cathode layer preliminary pressurizing step], and thus, end A1 of cathode layer 20 in all-solid battery 100 is formed.

Note that, in FIG. 2B, all-solid battery 101 is divided into two in the cutting step, but the present disclosure is not limited thereto. The all-solid battery 101 may be divided into three or more by preparing large-sized all-solid battery 101 and patterning portion A2 to be cut. In addition, as described above, the cutting step is not limited to the cutting of all-solid battery 101 after the pressing step, and may be performed at any timing as long as portion A2 can be cut after the cathode layer preliminary pressurizing step is performed. The cutting step may be performed, for example, before the solid-electrolyte layer forming step, the stacking step, or the pressing step.

The point that it is important to pressurize portion A2 corresponding to end A1 of cathode layer 20 in all-solid battery 100 in advance at a high pressure is derived from the following examination results, and the description thereof will be described.

<Examination Result>

In examining a process of realizing a structure of all-solid battery 100 according to the present exemplary embodiment, the following simulated cathode layer was prepared, and a state of the simulated cathode layer was observed.

[Preparation of Cathode Mixture]

First, calcium carbonate 11 (average particle size: within a range from 0.7 μm to 1 μm inclusive) was prepared as simulated particles of solid electrolytes 1, and a Li-containing Ni, Mn, Co complex oxide (particles within a range from 4 μm to 5 μm inclusive was prepared as cathode active materials 3. Prepared calcium carbonates 11 and cathode active materials 3 were mixed in a mortar at a compounding ratio of cathode active materials:calcium carbonates=85:15 in terms of weight to prepare a cathode mixture.

[Preparation of Multistage Pressed Product]

Next, an aluminum foil (thickness: 20 μm) was prepared as cathode current collector 6. An aluminum foil cut out in advance for φ 10 and the cathode mixture prepared above were sequentially put into a mold having a diameter of φ 10 mm, and then once pressurized at a pressure from 10 MPa to 100 MPa inclusive. After the pressure was released, the aluminum foil was pressurized again at a pressure from 400 MPa to 600 MPa inclusive to form a simulated cathode layer on the aluminum foil. As described above, hereinafter, the simulated cathode layer formed by multistage pressing is referred to as a "multistage pressed product".

[Preparation of Collective Pressed Product]

The simulated cathode layer was formed on the aluminum foil in a procedure similar to the above [Preparation of multistage pressed product] except that a pressurization procedure in the above [Preparation of multistage pressed product] was not once performed at a pressure from 10 MPa to 100 MPa inclusive but at a pressure from 400 MPa to 600 MPa inclusive. Hereinafter, the simulated cathode layer formed by collective pressing in this manner is referred to as a "collective pressed product".

[Dispersion States of Multistage Pressed Product and Collective Pressed Product]

Figure 3A:
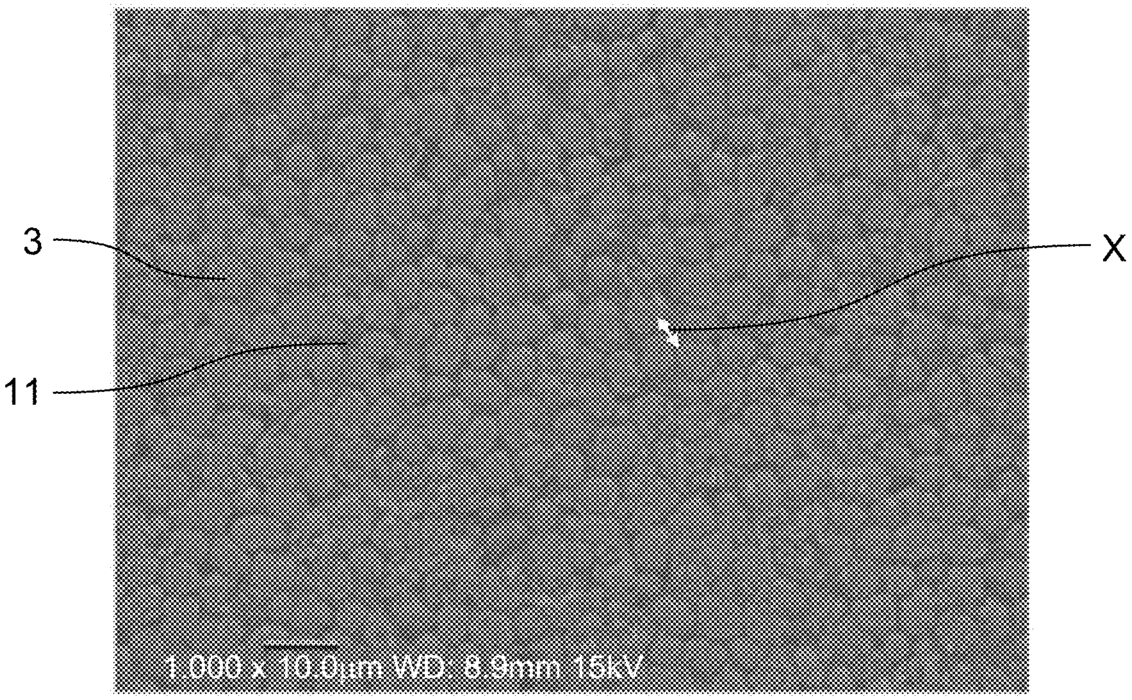
FIG. 3A is a diagram illustrating an SEM image of a pressed surface of a multistage pressed product.
Figure 3B:
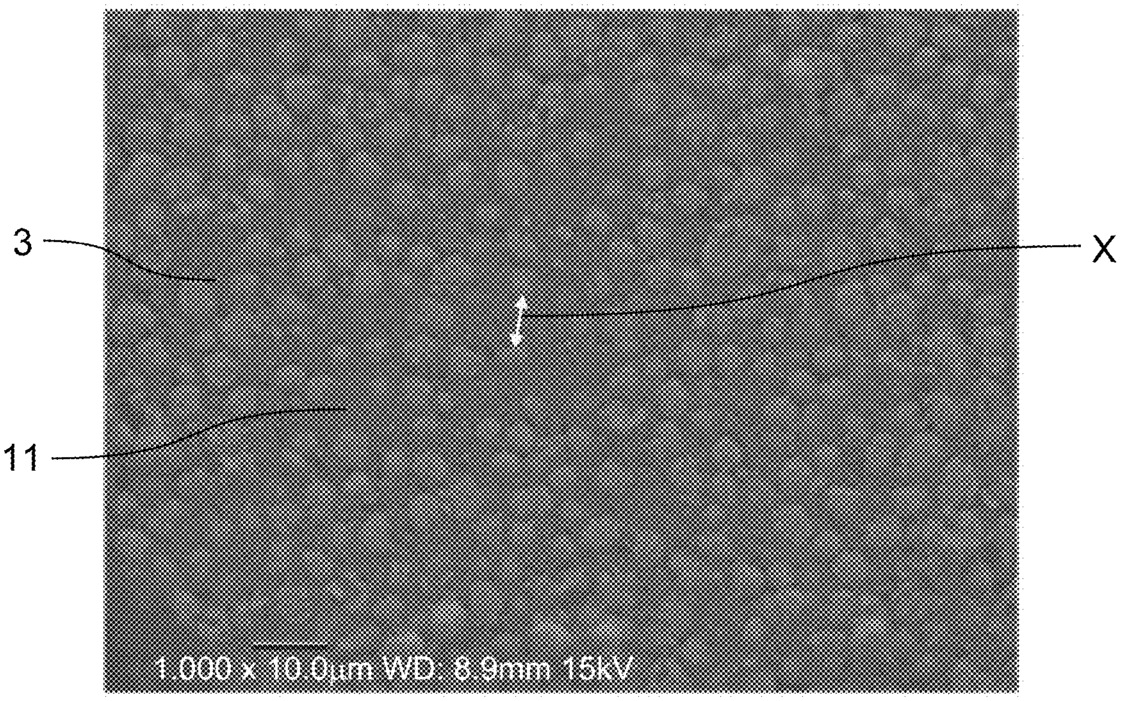
FIG. 3B is a diagram illustrating an SEM image of a pressed surface of a collective pressed product.

Pressed surfaces of the multistage pressed product and the collective pressed product were observed with a scanning electron microscope (SEM) image. FIG. 3A is a diagram illustrating an SEM image of the pressed surface of the multistage pressed product. FIG. 3B is a diagram illustrating an SEM image of the pressed surface of the collective pressed product. The pressed surfaces are surfaces of the cathode layer in the multistage pressed product and the collective pressed product in a direction perpendicular to the thickness direction. FIGS. 3A and 3B illustrate dispersion states of particles of calcium carbonates 11 which are simulated particles of cathode active materials 3 and solid electrolytes 1. As illustrated in FIGS. 3A and 3B, a plurality of particles of calcium carbonates 11 are present in gaps between a plurality of particles of dispersed cathode active materials 3. That is, a region between two adjacent particles of cathode active materials 3 is filled with a plurality of particles of calcium carbonate 11, or is continuously densely packed.

From the observation of the SEM images, it can be seen that cathode active materials 3 are more uniformly dispersed in the multistage pressed product illustrated in FIG. 3A than in the collective pressed product illustrated in FIG. 3B. In order to quantify a difference between the dispersion states, a distance between two adjacent particles of cathode active materials 3 (distance X in the drawing) was determined in the SEM images of FIGS. 3A and 3B, and histograms thereof were created. Here, distance X represents a shortest distance from a surface of one particle constituting cathode active materials 3 to a surface of a particle of cathode active material 3 adjacent to the particle. In addition, in FIGS. 3A and 3B, as a result of obtaining a Feret's diameter for the particle size of cathode active materials 3, an average particle size of cathode active materials 3 was 4.5 μm in the multistage pressed product and 4.2 μm in the collective pressed product, and almost the same average particle size was illustrated in the multistage pressed product and the collective pressed product.

Figure 4:
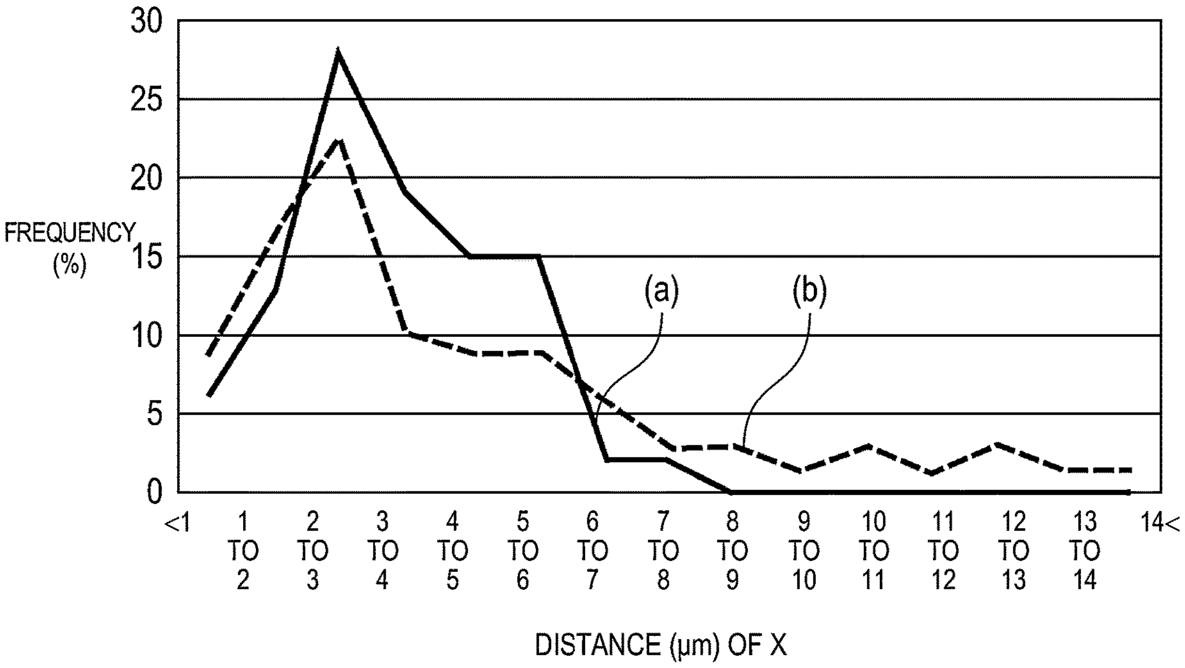
FIG. 4 illustrates histograms of distances between cathode active materials in the multistage pressed product and the collective pressed product.

FIG. 4 illustrates histograms of distances X between cathode active materials 3 in the multistage pressed product and the collective pressed product. (a) of FIG. 4 illustrates the histogram of distance X in the multistage pressed product, and (b) of FIG. 4 illustrates the histogram of distance X in the collective pressed product. From the results illustrated in FIG. 4, in the multistage pressed product ((a) of FIG. 4), there is no region where distance X is more than or equal to 8 μm to 9 μm, whereas in the collective pressed product ((b) of FIG. 4), there is a region where distance X is more than or equal to 8 μm to 9 μm. That is, in the collective pressed product, since calcium carbonates 11 are partially unevenly distributed, there are scattered portions where distance X between two adjacent particles of cathode active materials 3 greatly spreads, and there is a dense region of calcium carbonates 11 where the distance is 2 times or more than the average particle size of cathode active materials 3.

In addition, as a result of measuring electric resistance values in a cross-sectional direction (that is, the thickness direction) of the multistage pressed product and the collective pressed product at this time, a result in which the electric resistance value of the collective pressed product was higher by 1.5 times or more and 2 times or less than the electric resistance value of the multistage pressed product was obtained. This is considered to be because the dispersibility between cathode active materials 3 and calcium carbonates 11 is bad in the collective pressed product. It is difficult to obtain a contact point between cathode active materials 3, and thus, the electric resistance value is increased. Since a ratio between the electric resistance values depends on press conditions, a compounding ratio between the materials, and the like, the ratio is not particularly limited. From the viewpoint of enhancing an effect of suppressing a short circuit due to expansion and contraction of cathode active materials 3 at end A1 of cathode layer 20, the electric resistance value of the collective pressed product may be, for example, 1.5 times or more than the electric resistance value of the multistage pressed product, and may be 2 times or more than the electric resistance value of the multistage pressed product. In addition, from the viewpoint of appropriately lowering the electric resistance value, utilizing cathode active materials 3 for battery charging and discharging, and suppressing the deterioration in the energy density of the all-solid battery, the electric resistance value of the collective pressed product is, for example, 50 times or less than the electric resistance value of the multistage pressed product, and 20 times or less than the resistance value of the multistage pressed product.

In addition, on a press surface or a sliced surface of the collective pressed product, there is a portion where calcium carbonates 11 are densely present, whereas on another press surface or sliced surface, there is a portion where cathode active materials 3 are densely present. Thus, for example, when comparing the sliced surfaces, the collective pressed product has a sliced surface in which an area occupied by cathode active material 3 in a predetermined area is 0.9 times or less than an area of the multistage pressed product. That is, the collective pressed product has a sliced surface satisfying $P1/P2 \leq 0.9$. P1 is a proportion occupied by cathode active materials 3 per unit area in the sliced surface of the collective pressed product. P2 is a proportion occupied by cathode active materials 3 per unit area in the sliced surface of the multistage pressed product. This is because there is a portion where cathode active materials 3 are partially in a sparse state in the collective pressed product, and it is considered that this result leads to the difference between the electric resistance values, that is, the increase in the electric resistance value of the collective pressed product. Note that, in the present specification, the sliced surface is a surface sliced in a direction perpendicular to the thickness direction of the cathode layer.

In addition, the collective pressed product further has another sliced surface satisfying $P3/P4 \geq 1.1$. P3 is a proportion occupied by cathode active materials 3 per unit area on another sliced surface of the collective pressed product. P4 is a proportion occupied by cathode active materials 3 per unit area in another sliced surface of the multistage pressed product. This is a result that there is a portion where cathode active materials 3 are partially concentrated in the collective pressed product, and thus, an excessive increase in the electric resistance value of the collective pressed product is suppressed.

Figure 5A:
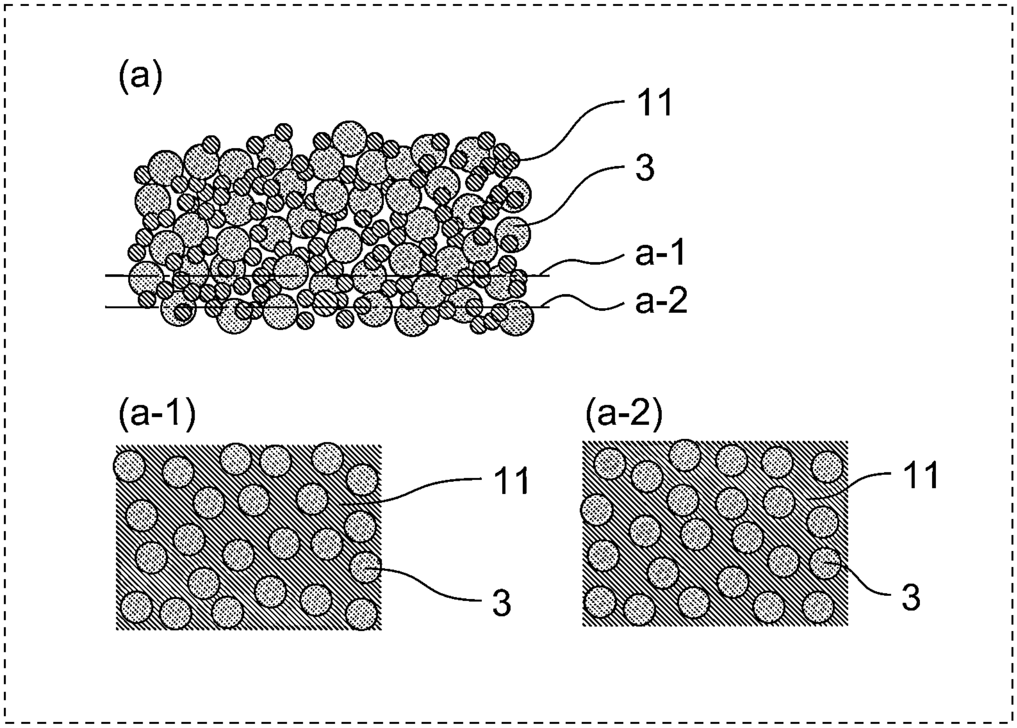
FIG. 5A is a schematic view illustrating a cross section and a sliced surface of the multistage pressed product.
Figure 5B:
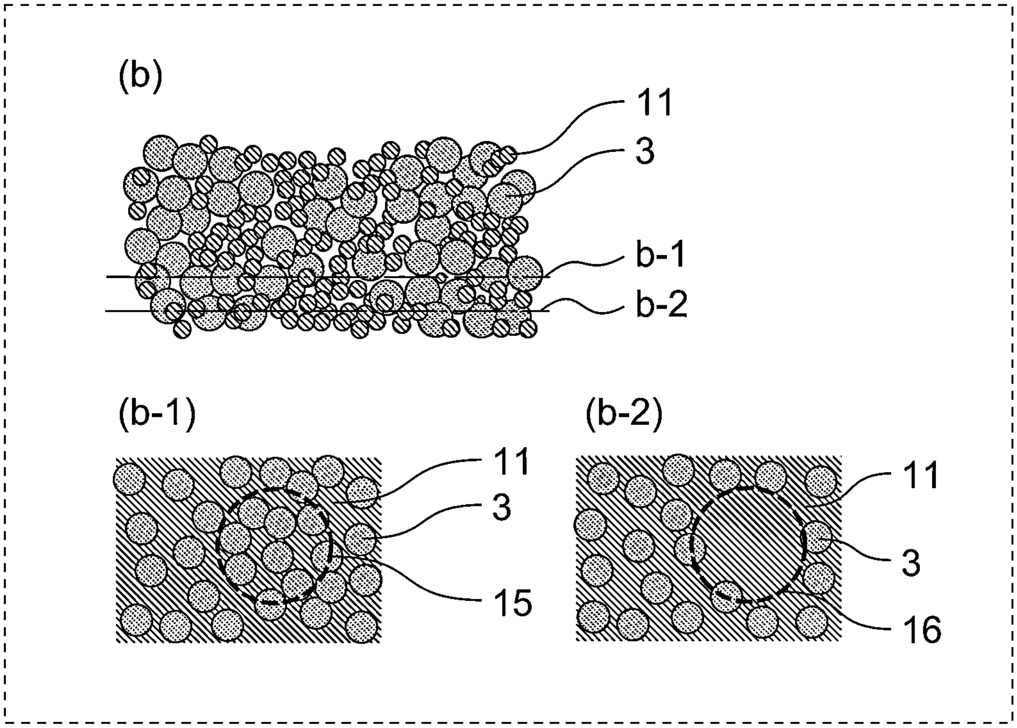
FIG. 5B is a schematic view illustrating a cross section and a sliced surface of the collective pressed product.

FIG. 5A is a schematic view illustrating a cross section and a sliced surface of the multistage pressed product. In addition, FIG. 5B is a schematic view illustrating a cross section and a sliced surface of the collective pressed product. (a) of FIG. 5A is a schematic cross-sectional view of the multistage pressed product illustrated in FIG. 3A. In addition, (a-1) and (a-2) of FIG. 5A illustrate schematic views of sliced surfaces of any portions at positions indicated by lines a-1 and a-2 in (a) of FIG. 5A, respectively. In addition, (b) of FIG. 5B illustrates a schematic cross-sectional view of the collective pressed product illustrated in FIG. 3B. In addition, (b-1) and (b-2) of FIG. 5B illustrate schematic views of any sliced surfaces at positions indicated by lines b-1 and b-2 in (b) of FIG. 5B, respectively. Note that, in (a-1) and (a-2) of FIG. 5A and (b-1) and (b-2) of FIG. 5B, illustration of a particle shape of calcium carbonate 11 is omitted for easy understanding of the dispersion state of cathode active materials 3.

As illustrated in (a-1) and (a-2) of FIG. 5A, in the multistage pressed product, cathode active materials 3 and calcium carbonates 11 are in similar dispersion states on any sliced surface. By contrast, as illustrated in (b-1) and (b-2) of FIG. 5B, in the collective pressed product, the dispersibility of cathode active materials 3 and calcium carbonates 11 is different depending on a portion to be sliced. For example, in one sliced surface, there is portion 15 where cathode active materials 3 are densely packed, and in another sliced surface, there are portions 16 where calcium carbonates 11 are densely packed in a region having a distance of 2 times or more than the average particle size of cathode active materials 3, in other words, there are portions 16 where cathode active materials 3 are in the sparse state.

A mechanism by which this result is obtained will be described with reference to FIG. 6.

Figure 6:
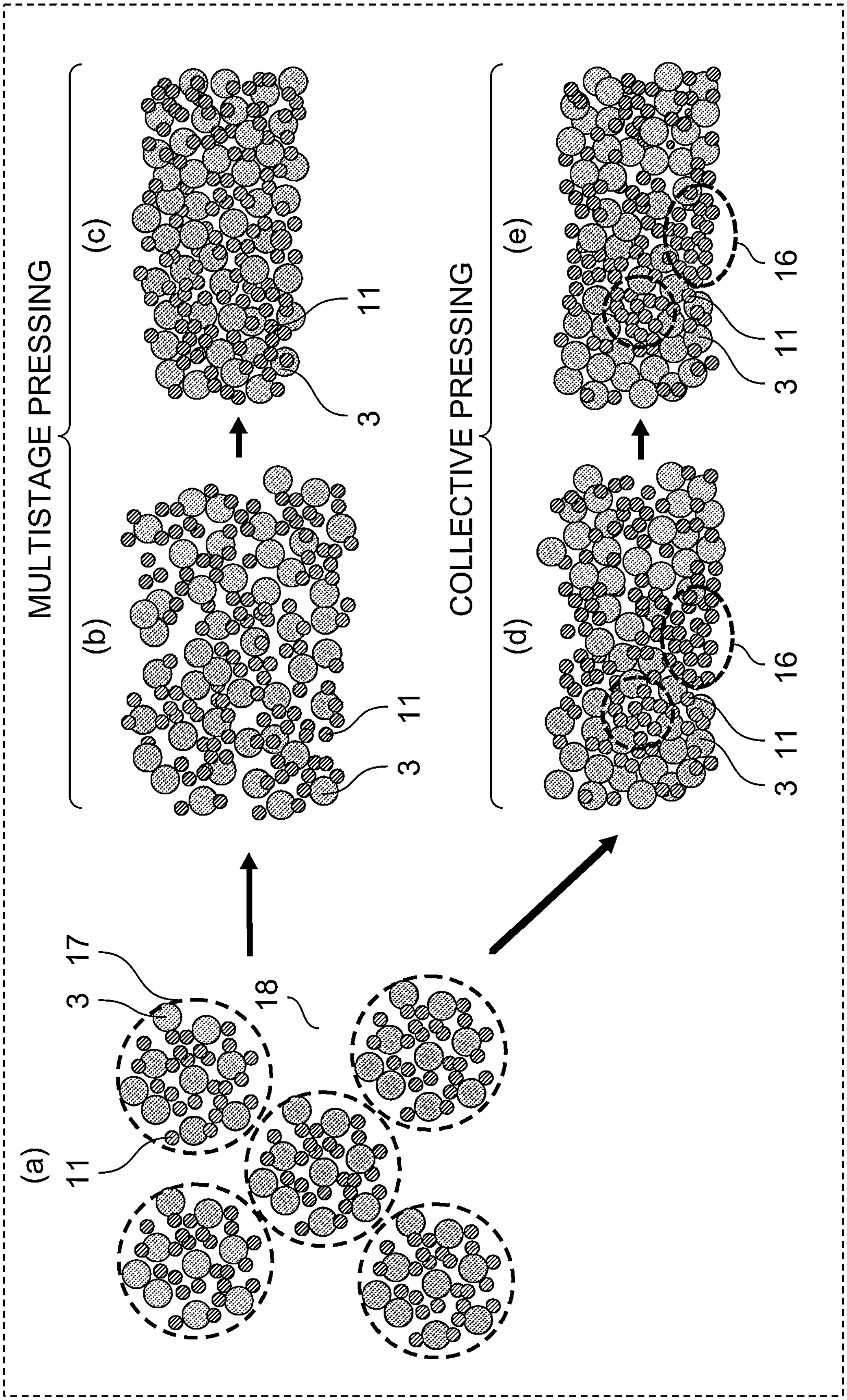
FIG. 6 is a diagram schematically illustrating a scene in which particles of cathode active materials and particles of calcium carbonates are filled by pressurization.

FIG. 6 is a diagram schematically illustrating a scene in which the particles of cathode active materials 3 and the particles of calcium carbonates 11 used as the simulated particles of solid electrolytes 1 are filled by pressurization. (a) of FIG. 6 illustrates an initial state before pressurization. (b) and (c) of FIG. 6 illustrate behaviors of the particles at the time of multistage pressing. (d) and (e) of FIG. 6 illustrate behaviors of the particles at the time of collective pressing.

First, in the initial state before pressurization illustrated in (a) of FIG. 6, the cathode mixture obtained by mixing cathode active materials 3 and calcium carbonates 11 stacked on the current collector contains a plurality of mixed aggregates 17 in which particles of some cathode active materials 3 and particles of some calcium carbonates 11 are dispersed and mixed. In addition, voids 18 are formed between mixed aggregates 17.

Subsequently, in a procedure of multistage pressing, mixed aggregates 17 collapse as illustrated in (b) of FIG. 6 by performing pressurization multiple times while the pressure is increased stepwise from a low pressure to a high pressure, and the particles of cathode active materials 3 and calcium carbonates 11 forming mixed aggregates 17 are filled while the voids present between the particles are reduced. In addition, at this time, the air present in voids 18 between mixed aggregates 17 is easily released by being pressurized multiple times, and as illustrated in (c) of FIG. 6, the particles of cathode active materials 3 and calcium carbonates 11 are re-arrayed while flowing. As a result, a uniform cathode layer is formed.

On the other hand, in a procedure of collective pressing, mixed aggregates 17 rapidly collapse by performing pressurization at a high pressure, and the particles of cathode active materials 3 and calcium carbonates 11 are pressurized before the air present in voids 18 between mixed aggregates 17 is released. As a result, the air present in voids 18 serves to prevent the particles of cathode active materials 3 and calcium carbonates 11 from being maximally re-arrayed due to flowing. The air in void 18 passes through an inside of mixed aggregate 17. At that time, as illustrated in (d) and (e) of FIG. 6, cathode active materials 3 having a large particle size are physically caught by each other and hardly flow, whereas calcium carbonates 11 having a small particle size are swept away by an escape path of the air, and portions 16 where calcium carbonates 11 are densely present are scattered.

All-solid battery 100 is produced by applying such examination results are applied to the formation of the multistage pressed product to the formation of the central portion of cathode layer 20 and the formation of the collective pressed product to the formation of end A1 of cathode layer 20 and using solid electrolytes 1 instead of calcium carbonates 11. Specifically, in the cathode layer preliminary pressurizing step, the cathode mixture is pressurized and compressed in multiple stages by increasing the pressure stepwise, and thus, a degree of aggregation of cathode active materials 3 and solid electrolytes 1 can be controlled. Due to the use of this concept, it is possible to intentionally produce end A1 of cathode layer 20 in all-solid battery 100 illustrated in FIG. 1 to increase the number of portions where solid electrolytes 1 are densely packed as compared with the central portion of cathode layer 20.

Cathode layer 20 formed in this manner includes a region where a plurality of particles constituting solid electrolytes 1 are filled or continuously densely packed as in portions 16 where the simulated particles of solid electrolytes 1 are densely packed in the sliced surface in a case where end A1 of cathode layer 20 is sliced. In addition, among the plurality of particles constituting cathode active materials 3, a distance between two adjacent particles in a positional relationship across the region is 2 times or more than the average particle size of cathode active materials 3. Accordingly, it is possible to form a configuration in which a contact area between the particles of cathode active materials 3 at end A1 of cathode layer 20 is smaller than in the central portion, and it is possible to realize a configuration in which the electric resistance value is high at the end of cathode layer 20. As a result, at end A1 of cathode layer 20, cathode active materials 3 that are difficult to be utilized for charging and discharging increases, expansion and contraction of cathode active material 3 due to charging and discharging decreases, and an effect of suppressing chipping and falling of cathode active materials 3 at end A1 of cathode layer is obtained. That is, an effect of suppressing the occurrence of the short circuit at the end of all-solid battery 100 is obtained.

The ratio of the electric resistance value at end A1 of cathode layer 20 to the electric resistance value at the central portion of cathode layer 20 for enhancing the effect of suppressing the short circuit is, for example, 1.5 times or more, and may be 2 times or more. In addition, from the viewpoint of suppressing the deterioration in the energy density of all-solid battery 100, the ratio of the electric resistance value at end A1 of cathode layer to the electric resistance value at the central portion of cathode layer 20 is, for example, times or less, and may be 20 times or less.

In addition, in a case where the region corresponding to end A1 is represented by a distance from the end toward the central portion of all-solid battery 100, it is possible to achieve both the suppression of the short circuit and the energy density by appropriately setting the distance. Thus, the region of end A1 when viewed along the thickness direction is, for example, a region from 0.2 mm to 15 mm inclusive from the end of all-solid battery 100, and may be a region from 0.5 mm to 5 mm inclusive from the end of all-solid battery 100.

In addition, for example, in a case where cathode layer 20 is sliced, cathode layer has a first surface which is a sliced surface obtained by slicing end A1 of cathode layer and a second surface which is a sliced surface obtained by slicing the central portion of cathode layer 20. The first surface has first proportion A which is a proportion occupied by the cathode active materials per unit area of the first surface. The second surface has second proportion B that is a proportion occupied by the cathode active materials per unit area of the second surface. A relationship of $A/B \leq 0.9$ is satisfied. Accordingly, there is a portion where cathode active materials 3 are in the sparse state at end A1 of cathode layer and thus, cathode active materials 3 are hardly utilized at end A1 of cathode layer 20. Thus, as described above, the effect of suppressing the short circuit of all-solid battery 100 is obtained.

In addition, for example, in a case where cathode layer 20 is sliced, cathode layer has a third surface which is a sliced surface obtained by slicing end A1 of cathode layer 20 and a fourth surface which is a sliced surface obtained by slicing the central portion of cathode layer 20. The third surface has third proportion C that is a proportion occupied by the cathode active materials per unit area of the third surface. The fourth surface has fourth proportion D which is a proportion occupied by the cathode active materials per unit area of the fourth surface. A relationship of C/D≥1.1 is satisfied. Accordingly, at end A1 of cathode layer 20, as described above, at end A1 of cathode layer 20, there is a portion where cathode active materials 3 are in the sparse state, but there is also a portion where cathode active materials 3 are densely packed. Thus, an excessive increase in the electric resistance value at end A1 of cathode layer 20 is suppressed, and deterioration in the energy density of all-solid battery 100 can be suppressed. Note that, the first surface and the third surface are sliced surfaces sliced at different positions. In addition, the second surface and the fourth surface may be sliced surfaces sliced at different positions, or may be sliced surfaces sliced at the same position.

In addition, in the method for producing all-solid battery 100 described with reference to FIGS. 2A and 2B, in the pressurization of coating film 21 in the cathode layer preliminary pressurizing step, first portion A2 (see (c) of FIG. 2A and (g) and (h) of FIG. 2B) corresponding to end A1 of cathode layer 20 in all-solid battery 100 formed in the subsequent cutting step is pressurized with a stronger pressure than in the second portion different from first portion A2. At that time, the pressure of the pressurization at first portion A2 corresponding to end A1 is set to such a pressure that the mixed aggregates of cathode active materials 3 and solid electrolytes 1 collapse and the particles of cathode active materials 3 and solid electrolytes 1 are not re-arrayed. On the other hand, the second portion needs to be pressurized with a weaker force than in portion A2 corresponding to end A1 such that the particles of cathode active materials 3 and solid electrolytes 1 are re-arrayed. This re-array is controlled by adjusting a material type and a pressure. Subsequently, entire coating film 21 is pressurized to form cathode layer 20. As a result, it is possible to obtain all-solid battery 100 illustrated in FIG. 1 having a structure in which the dispersibility of cathode active materials 3 and solid electrolytes 1 is different from in the other portion at end A1 of cathode layer 20 in all-solid battery 100.

Further, a specific example of a device for producing all-solid battery 100 will be described. At the time of initial pressurization in the cathode layer preliminary pressurizing step, a structure of portion A2 can be realized by pressing with a mold having a shape in which only portion A2 corresponding to end A1 in cathode layer 20 protrudes on a surface on a pressurizing side. In addition, in the pressurization in the cathode layer preliminary pressurizing step, a method using a flat plate pressing machine or a method using a roll pressing machine such as roll-to-roll may be performed by providing a mechanism for pressurizing coating film 21 to be cathode layer 20 on the surface having the above-described protrusion shape. An advantage of such a production method is that it is possible to form cathode layer 20 in which end A1 having different electric resistance values and other portions are separately formed by using the identical material without requiring a complicated process such as using another material only for end A1 of cathode layer 20. Thus, an effect of reducing the production cost of all-solid battery 100 and simplification of the production step can be expected.

The pressure to be pressurized in the cathode layer preliminary pressurizing step is adjusted in accordance with the concept of the mixed aggregates, and is adjusted by, for example, a type and a mixing ratio of cathode active materials 3 and solid electrolytes 1.

In addition, a cross-sectional shape of a protrusion having a protrusion shape of the mold may be a rectangular shape or an elliptical shape, but when an edge of the protrusion is sharp, there is a possibility that cathode layer 20 is broken, and from the viewpoint of suppressing breakage, an R surface (rounded surface with curvature) may be provided. Curvature R of the R surface varies depending on the type of the material of cathode layer 20, but is, for example, more than or equal to the average particle size of cathode active materials 3, and may be more than or equal to 0.5 mm. In addition, a width of the protrusion of the mold is, for example, from 1 mm to 30 mm inclusive, and may be from 2 mm to 10 mm inclusive from the viewpoint of effectively realizing the configuration of end A1 and suppressing deterioration in the energy density of all-solid battery 100.

OTHER EXEMPLARY EMBODIMENTS

While the all-solid battery according to the present disclosure has been described above based on the exemplary embodiments, the present disclosure is not limited to the above-described exemplary embodiments. The exemplary embodiments to which various modifications conceivable by those skilled in the art are applied, and another form constructed by combining some components in the exemplary embodiment is also included in the scope of the present disclosure without departing from the gist of the present disclosure.

For example, in the above exemplary embodiments, an example in which ions conducting in all-solid battery 100 are lithium ions has been described, but the present disclosure is not limited thereto. The ions conducting in all-solid battery 100 may be ions other than lithium ions, such as sodium ions, magnesium ions, potassium ions, calcium ions, or copper ions.

The all-solid battery and the like according to the present disclosure can suppress the occurrence of the short circuit.

INDUSTRIAL APPLICABILITY

The all-solid battery according to the present disclosure is expected to be applied to various batteries such as a power supply for mobile electronic devices and an in-vehicle battery.

REFERENCE MARKS IN THE DRAWINGS

1, 2, 5: solid electrolyte
3: cathode active material
4: anode active material
6: cathode current collector
7: anode current collector
10: solid-electrolyte layer
11: calcium carbonate
16, A2: portion
17: mixed aggregate
18: void
20: cathode layer
21, 31: coating film
30: anode layer
100, 101: all-solid battery
A1: end

The invention claimed is:

1. An all-solid battery comprising:

a cathode current collector;

a cathode layer that contains cathode active materials constituted by a plurality of particles and first solid electrolytes constituted by a plurality of particles;

a solid-electrolyte layer that contains third solid electrolytes;

an anode layer that contains anode active materials and second solid electrolytes; and an anode current collector, the cathode current collector, the cathode layer, the solid-electrolyte layer, the anode layer, and the anode current collector being stacked in this order, wherein the cathode layer includes a region where the plurality of particles constituting the first solid electrolytes are filled or continuously densely packed in a sliced surface of the cathode layer in a case where an end of the cathode layer is sliced, wherein a distance between two adjacent particles having a positional relationship across the region among the plurality of particles constituting the cathode active materials is 2 times or more than an average particle size of the cathode active materials, wherein in a case where the cathode layer is sliced, the cathode layer includes a first surface that is a sliced surface obtained by slicing the end of the cathode layer and a second surface that is a sliced surface obtained by slicing a central portion of the cathode layer, the first surface has a first proportion A that is a proportion occupied by the cathode active materials per unit area of the first surface, the second surface has a second proportion B that is a proportion occupied by the cathode active materials per unit area of the second surface, and a relationship of $A/B \leq 0.9$ is satisfied, and wherein in a case where the cathode layer is sliced, the cathode layer includes a third surface that is a sliced surface obtained by slicing the end of the cathode layer and a fourth surface that is a sliced surface obtained by slicing the central portion of the cathode layer, the third surface has a third proportion C that is a proportion occupied by the cathode active materials per unit area of the third surface, the fourth surface has a fourth proportion D that is a proportion occupied by the cathode active materials per unit area of the fourth surface, and a relationship of $C/D \geq 1.1$ is satisfied.

2. A method for producing an all-solid battery comprising:

a cathode current collector;

a cathode layer that contains cathode active materials constituted by a plurality of particles and first solid electrolytes constituted by a plurality of particles;

a solid-electrolyte layer that contains third solid electrolytes;

an anode layer that contains anode active materials and second solid electrolytes; and an anode current collector, the cathode current collector, the cathode layer, the solid-electrolyte layer, the anode layer, and the anode current collector being stacked in this order, wherein the cathode layer includes a region where the plurality of particles constituting the first solid electrolytes are filled or continuously densely packed in a sliced surface of the cathode layer in a case where an end of the cathode layer is sliced, and wherein a distance between two adjacent particles having a positional relationship across the region among the plurality of particles constituting the cathode active materials is 2 times or more than an average particle size of the cathode active materials, the method comprising:

a cathode layer forming step of dry-coating a cathode mixture on a cathode current collector to form a coating film on the cathode current collector, the coating film including the cathode mixture containing a plurality of particles constituting cathode active materials and a plurality of particles constituting first solid electrolytes;

a cathode layer preliminary pressurizing step of pressurizing the coating film to form a cathode layer;

a stacking step of stacking the cathode layer, a solid-electrolyte layer, and an anode layer in this order to form a stacked body; and a pressing step of pressurizing the stacked body, wherein in the cathode layer preliminary pressurizing step, the coating film is pressurized one or more times, and a first portion in the coating film in a first pressurization is pressurized with a stronger pressure than in a second portion different from the first portion.

3. The method for producing the all-solid battery according to claim 2, wherein the coating film is pressurized two or more times in the cathode layer preliminary pressurizing step.

4. The method for producing the all-solid battery according to claim 2, further comprising a cutting step of cutting the first portion along a thickness direction of the cathode layer.

5. The method for producing the all-solid battery according to claim 4, wherein, in the cathode layer preliminary pressurizing step, the first portion is pressurized to become an end of the all-solid battery after cutting in the cutting step.

* * * * *